May 12, 1959  K. J. KNUDSEN  2,886,776
MULTIPLE TESTING METER
Filed Feb. 8, 1956  3 Sheets-Sheet 1

INVENTOR.
Knud J. Knudsen
BY
Johnson and Kline
ATTORNEYS

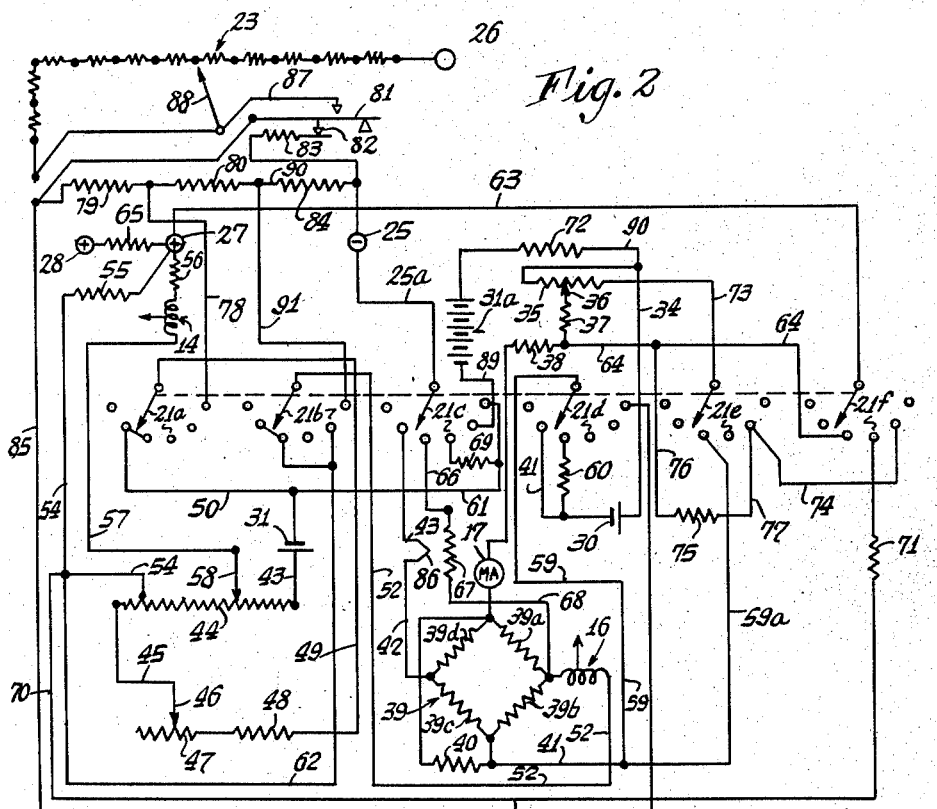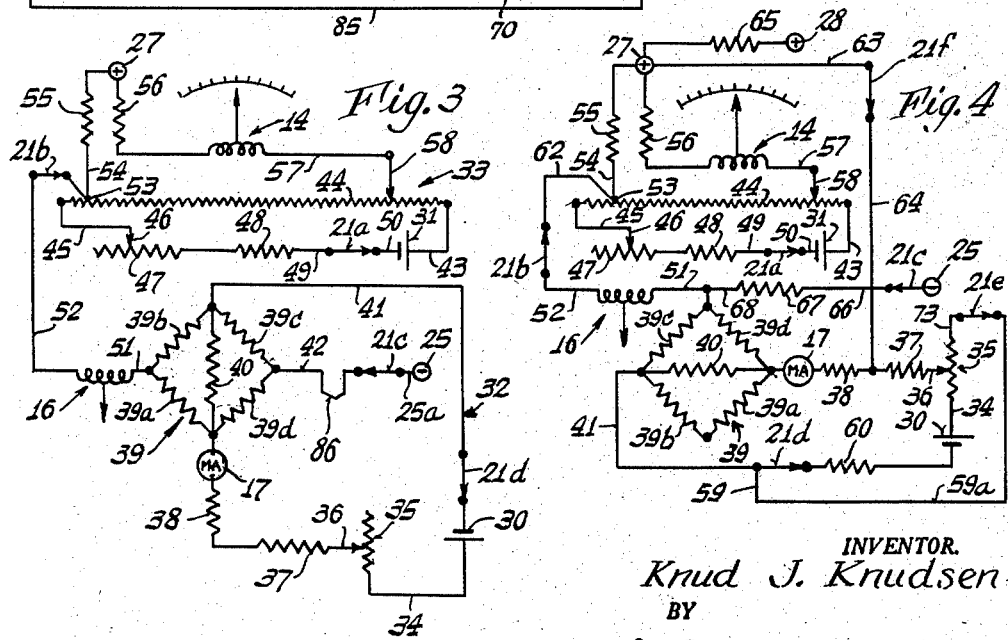

Figures 5, 6, 7:
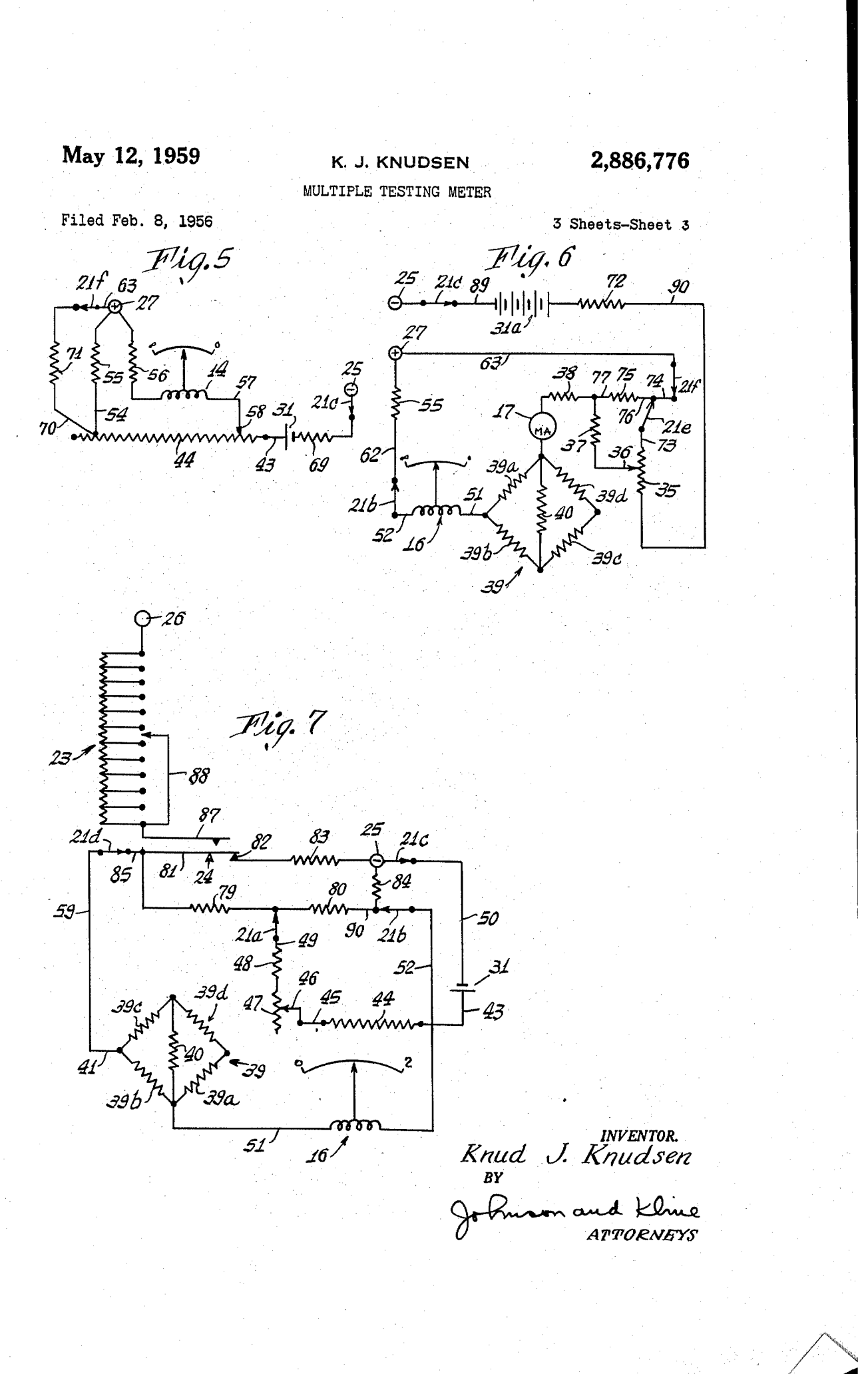

May 12, 1959

K. J. KNUDSEN 2,886,776

MULTIPLE TESTING METER

Filed Feb. 8, 1956

INVENTOR.
Knud J. Knudsen
BY
Johnson and Kline
ATTORNEYS

United States Patent Office 2,886,776
Patented May 12, 1959

2,886,776

MULTIPLE TESTING METER

Knud J. Knudsen, Woodbury, Conn., assignor to The Lewis Engineering Company, Naugatuck, Conn., a corporation of Connecticut Application February 8, 1956, Serial No. 564,164

1 Claim. (Cl. 324—73)

This invention relates to a multiple testing instrument and more particularly to an instrument which can be used for testing completely a thermocouple system.

A thermocouple system is composed of a pyrometer and a thermocouple having hot and cold junctions with two leads connecting the thermocouple to the pyrometer. The hot junction is located at the place where the temperature is desired to be measured with the two leads connecting the hot junction to the pyrometer (or a voltmeter having a scale graduated in degrees of temperature). The cold junction is positioned in series with one of the leads, generally in the pyrometer casing. The pyrometer is generally located quite a distance away from the hot junction; for example, when such a system is used in an airplane, the pyrometer may be located in the cockpit while the hot junction may be located adjacent the engine.

In such a thermocouple system, inaccuracies in the pyrometer not indicating the temperature of the place where the hot junction is located may be traced to five potential causes. These are the thermocouple hot junction not developing the voltage corresponding to the temperature; secondly, the pyrometer being inaccurate in indicating the temperature corresponding to the thermocouple voltage; thirdly, at low temperatures of the hot junction there may be excessive leakage to ground in the system, i.e., part or all of the thermocouple voltage is being grounded; fourthly, when the hot junction is hot there may also be leakage to ground; and fifthly, the resistance of the leads of the thermocouple to the pyrometer may have changed their resistance with a corresponding decrease in thermocouple voltage at the pyrometer.

Heretofore, in checking a thermocouple system for possible inaccuracies, a plurality of instruments and other paraphernalia was required. For example, necessary equipment included one instrument for each of the factors contributing to the inaccuracy, a thermos bottle containing a coolant for the cold junction to maintain it at a known temperature, and other devices. It will be apparent that such instruments are expensive, besides being substantially non-portable, in themselves, and require constant checking to be accurate. Also, great skill was required, in addition to a tremendous amount of time with corresponding increase in the possibility of error, to test a thermocouple system completely.

It is accordingly, an object of this invention to provide a single instrument which is capable of checking the elements of the thermocouple system for any inaccuracies in the system and thus permit tracing the inaccuracy to the element causing same.

It is further an object of this invention to provide a multiple testing instrument of the above-disclosed type in which the instrument is accurate to a degree necessary when used to check any one of the elements.

It is a further object of this invention to provide a multiple meter of the above-disclosed type which is simple to operate and to understand and which is quickly and easily connected in the thermocouple system.

It is another object to provide a multiple testing instrument for a thermocouple system which is economical to manufacture, retains its accuracy for an exceedingly long time, and in which the instrument is contained in a single case for ready portability.

Other features and advantages will hereinafter appear.

In the accompanying drawings:

Fig. 2 is a schematic diagram of the electrical components of the instrument.

Fig. 3 is a schematic diagram of the elements of the instrument as they would be when the instrument is used to measure the temperature of the hot junction of the thermocouple.

Fig. 4 is a schematic diagram of the electrical components of the instrument as they would be when it is utilized to test the accuracy of the pyrometer.

Fig. 5 is a schematic diagram of the elements of the instrument when it is being used to measure the leakage resistance to ground when the hot junction is hot.

Fig. 6 is a schematic diagram of the elements of the instrument when it is being used to test the leakage resistance to ground of the leads when the hot junction is cold.

Fig. 7 is a schematic diagram of the electrical components of the instrument as they would be when it is employed to measure the resistance of the leads.

Figure 1:
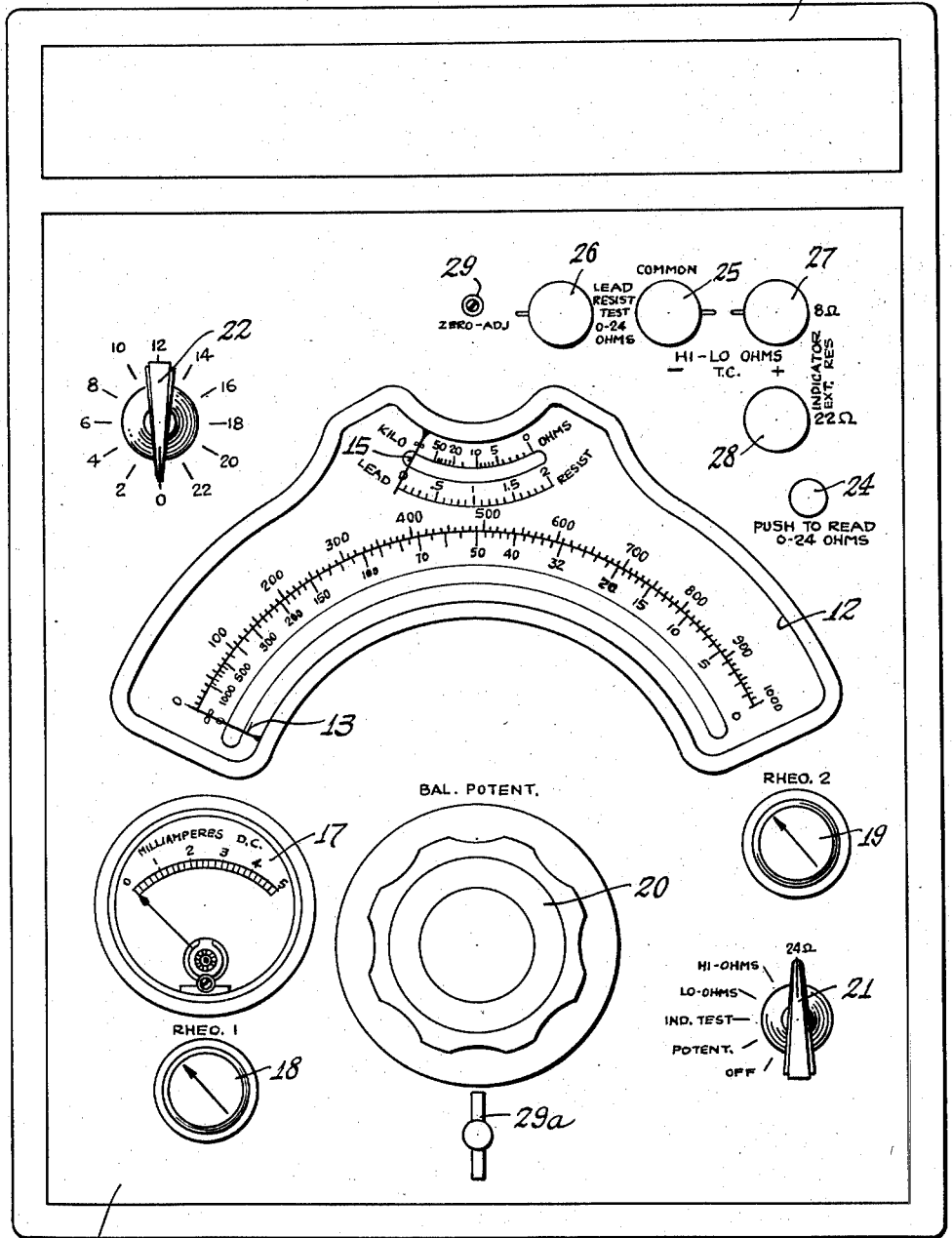
Figure 1 is an elevation of the instrument showing the face thereof.

Generally considered, my invention consists of a single meter which can check for inaccuracies in any portion of the thermocouple system with ease and accuracy. In the embodiment of the invention hereinafter set forth, there is provided a single manually settable control member which operates a gang switch for connecting in circuit the necessary elements of the instrument required to measure or test one of the above noted five causes of inaccuracies at a time. Some of the elements are used in the circuit for each of the five test positions while others are usable in less than five. Accordingly, the meter is equipped with three indicating instruments, two being deflecting galvanometers, one with a large scale, the other with a small and the third being a milliammeter.

Referring to the drawings, there is shown in Fig. 1 the face of the meter on which are positioned the indicating meters, the connecting posts and the manual control knobs. The meter is mounted in a casing, generally indicated by the reference numeral 10, which is preferably wooden with substantially rectangular sides. The face cover plate 11 is provided with a glass covered opening 12 for viewing the indicators of the meters. The indicator 13 is part of a current measuring instrument 14 hereinafter called the main meter, while the indicator 15 is part of a deflecting galvanometer 16 generally used as the balancing meter but which is in two test positions used as the indicating meter. There is additionally provided a milliammeter 17 for controlling the current flow during some of the various testing operations.

Two control knobs 18 and 19 are attached to shafts of rheostats which project through the cover plate 11. A balancing potentiometer, which may be a slide wire resistance is controlled by the knob 20. A manually operable member 21 to change test positions is attached to a 6-gang switch (see Fig. 2) in which each gang is referred to by the reference numerals 21a, 21b, 21c, 21d, 21e and 21f from left to right respectively. Further, to provide for the five test positions of the meter and an "off" position, each gang has six contact positions. A step resistance control member 22 is also located on the cover plate 11 for controlling a step resistance 23 used in one test position. A push switch 24 utilized in the lead resistance test position to be later described also is operable from the face of the meter since it projects through the cover plate.

In order to connect the meter to the thermocouple system, either to the leads or to the pyrometer, there is provided a common negative binding post 25 and three positive binding posts 26, 27 and 28. For initially adjusting the meter to mechanical zero, a zero adjustment 29 for the deflecting galvanometer 16 is provided operable from the front of the meter since it projects through the cover plate while the main meter 14 zero adjustment is operated by the knob 29a. Positioned within the casing are two 1½ volt batteries 30 and 31 and a 67½ volt, low-capacity battery 31a, all shown schematically in Figs. 2–7 inclusive. These batteries furnish the energy in the form of direct current necessary for the functioning of the meter in its various test positions.

To facilitate comprehension of the invention, the electrical circuits for each of the test positions has been illustrated separately and will be described in conjunction with the description of the entire circuit of the instruments as shown in Fig. 2. Like reference numerals will be used to indicate elements that are common to each of the test position circuits. Like reference numerals will be also utilized in Fig. 2 to show the same elements wherever they may be conveniently and intelligently utilized. It is to be understood however, that all the components in the various test position circuits (Figs. 3–7 inclusive) are also in the schematic diagram of the whole meter as shown in Fig. 2.

Referring to Fig. 3, there is shown a testing circuit in which the gang switch 21 has all gang switch arms located on test position 1. This circuit is utilized to test the voltage emitted by the hot junction of the thermocouple when the junction is at a known temperature. In order to obviate error caused by current flow in the leads resulting in a diminution of the voltage, the circuit acts as a pyrometer potentiometer, i.e., it opposes the thermocouple voltage with another voltage of the same magnitude until there is no current flowing and it then measures the other voltage.

This circuit is composed of essentially two minor circuits, a compensating circuit generally indicated by the reference character 32 for compensating for the ambient temperature of the cold junction 86 of the thermocouple and a balancing circuit 33 for varying the magnitude of the opposing voltage and measuring same. The battery 30 in the compensating circuit has its positive terminal connected by a line 34 to a rheostat 35 which is controlled by the knob 18 and is preferably of a value of 100 ohms. A sliding tap 36 is connected to a resistor 37 which may be 220 ohms and the resistor 37 is connected in series with a resistor 38 which may be of 39 ohms. The milliammeter 17 is connected in series between the resistor 38 and a compensating bridge, generally indicated by the reference numeral 39. Normally, the bridge has four legs 39a, 39b, 39c and 39d made from material having different temperature coefficients of resistance for compensating for the temperature of the cold junction. Such a bridge may be of the type disclosed in my copending application, Serial No. 534,346, filed September 14, 1955. A calibrating resistor 40 parallels the bridge and is of a magnitude of about 50 ohms approximately, when the cold junction is composed of "Chromel-Alumel." For thermocouples made from different materials, the value and material of the bridge legs and the calibrating resistor 40 will be altered in order to calibrate the meter therefor.

A line 41 connected to the junction between the legs 39b and 39c completes the circuit to the negative side of the battery 30 through the gang switch 21d. (In the schematic diagram of Fig. 2 the line 41 includes the line 59.) The common negative binding post 25 is connected through a line 25a to the gang switch 21c and then is connected to one side of the cold junction 86 of the thermocouple. A line 42 connects the other side of the cold junction to the compensating bridge between the legs 39c and 39d.

The balancing circuit 33 is provided with battery 31 which has its positive side connected by a line 43 to a slide wire resistance 44, which may be on the order of 1 ohm. A line 45 connects the other end of the slide wire resistance 44 to a tap 46 operable on a rheostat 47. The tap 46, movable on the rheostat 47, is controlled by the knob 19 and the rheostat 47 preferably has a value of approximately 100 ohms. A resistor 48, which may be of 10 ohms, is connected between rheostat 47 on one side and gang switch 21a on the other side, by a line 49. A line 50 connects with the negative side of the battery to the gang switch 21a.

Joined between the compensating circuit 32 and the balancing circuit 33 is the deflecting galvanometer 16 by a line 51 connected to the junction of legs 39a and 39b of the compensating bridge and by a line 52 to the gang switch 21b and thence to a point 53 on the slide wire resistance 44. The point 53 is located intermediate the ends of the slide wire 44 in order to be able to provide a change in polarity of the voltage. Thus, the portion of the slide wire to the right of the point 53 produces a positive voltage while the portion to the left produces a negative voltage. A line 54 connects the point 53 through a calibrating resistor 55, which may be approximately 3.44 ohms, and thence to the binding post 27. The value of the resistor 55 depends on the type of material in the hot junction of the thermocouple. A negative temperature coefficient of resistance resistor 56, preferably having a value of about .85 ohm is connected between the binding post 27 and the main meter 14. A line 57 connects the other side of the meter 14 to a tap 58 operable on the slide wire resistor 44. The position of the tap 58 is controlled by the balancing potentiometer knob 20. The operation of this circuit will be described infra.

Fig. 4 illustrates the circuit formed when the manually operable member 21 is in the indicator test position or test position #2. This circuit is utilized to compare the readings of the pyrometer in the thermocouple system with the reading of the main meter 14 to test the accuracy of the pyrometer. Basically, a voltage is applied to the pyrometer which deflects its indicator and the same magnitude of voltage is impressed on the main meter 14, consequently, differences between the readings will be traceable to an error in the pyrometer. The battery 30 has its positive side connected by line 34 to rheostat 35 thence through a line 73, switch 21e, a line 59a, line 59 to switch 21d, a resistor 60, which may be on the order of 130 ohms, and thence to the negative side of the battery 30. The slider 36, operating on the rheostat 35 is connected to the resistor 37, resistor 38, milliammeter 17 and to the compensating bridge at the junction of legs 39d and 39a. The line 41 connects the compensating bridge between the resistors 39b and 39c to the switch 21d.

The positive side of the battery 31 is connected by line 43 through slide wire resistor 44, line 45, tap 46, rheostat 47, resistor 48, line 49, switch 21a and line 50 to the negative side of the battery (line 50 being shown in Fig. 2). A connection through the deflecting galvanometer 16 is made from the junction of the legs 39c and 39d of the compensating bridge 39 by a wire 51 through the galvanometer 16, line 52, switch 21b and a line 62 to the point 53 on the slide wire resistance 44. Calibrating resistor 55 is connected between the point 53 and the positive binding post 27. The resistor 56 is connected between the binding post 27 and the main meter 14 and thence through the line 57 to the tap 58 on the slide wire 44. Another line 63 is connected to the binding post 27 thence through switch 21f and a line 64 to the junction between resistors 37 and 38. The common negative binding post 25 is connected through switch 21c, a line 66 and a resistor 67 to the junction of the compensating bridge between legs 39c and 39d by line 68. The value of the resistor 67 is of such a magnitude that the total resistance from the binding post 25 to the junction on the compensating bridge is a total of 8 ohms including the lead resistance of the wires. In order to provide for testing of meters having both 8 and 22 ohm external lead resistance, an additional positive binding post 28 is connected to the post 27 through a 14 ohm resistor indicated by the reference numeral 65.

Fig. 5 is a schematic diagram of how the elements of the multiple meter of the present invention are connected when it is desired to measure the thermocouple leakage resistance to ground when the hot junction is hot. This circuit consists of measuring a proportionate part of the amount of current which flows from the thermocouple system to the ground in order to determine the resistance to flow. The negative binding post 25 through switch 21c is connected to a resistor 69, which may have a value of 53 ohms, and then to the negative side of the battery 31. In Fig. 2 this connection is via lines 61 and 50. The positive side of the battery 31 is connected to line 43, through slide wire resistor 44 and thence to the binding post 27 by means of line 54 and resistor 55. Paralleling resistor 55 is a resistor 71, which may have a value of 2.6 ohms, and is connected by line 70 through switch 21f and line 63 to the post 27. The main meter 14 is also connected on one side through line 57 and tap 58 and on the other side through resistance 56 to the binding post 27. It will be apparent that with no leakage there will be no current through the meter 14 since the thermocouple system and the ground are connected in series with the battery. Moreover, the movable tap 58, in combination with the resistors 71 and 55, provide for compensating the circuit for changes in the battery voltage.

In Fig. 6 the circuit diagram of the instrument is shown when it is desired to measure the leakage to ground of the thermocouple when the hot junction is cold. Because of difference in value between the minimum allowable resistance the same circuit in Fig. 5 cannot be used. For example, the minimum permissible resistance when cold is 10,000 ohms, while when hot, the minimum desired resistance of the leads in leakage to ground is 500 ohms. The reason for having different permissible values is that the resistance of the ceramic coating on the hot junction of the thermocouple decreases with temperature rise, accordingly, it will have less resistance when it is hot than when it is cold.

In Fig. 6 the manually operable member 21 is positioned at the low ohm location, i.e., test position 4, with the movable gang switch arms connected to the second-last counterclockwise set of stationary contacts. The battery 31a has its negative side connected through a line 89 to switch 21c and thence to the negative binding post 25. The positive side of the battery is led through a resistor 72, which may have a value of 10,000 ohms, and a line 90 to the rheostat 35. The switch 21e is connected to the other side of the rheostat 35 by a line 73. A line 74 connects the switch 21e to the switch 21f which in turn is connected to the positive binding post 27 by line 63. The slider 36, operable by the knob 18, taps off the required voltage and leads it through resistor 37, resistor 38 and the milliameter 17 to the compensating bridge at the junction of legs 39d and 39a. The calibrating resistor 40 is connected between the junction of legs 39b and 39c and the junction of legs 39a and 39d. At the junction of legs 39a and 39b the lead 51 connects the bridge with the deflecting galvanometer 16, then through line 52 to the switch 21b. A line 62 connects the switch 21b to the binding post 27 with the resistor 55 in series in the line. A resistor 75, which may have a value of 20 ohms, is connected between the resistors 37 and 38 at the junctions thereof and switch 21e by means of lines 76 and 77 for providing a parallel path for the voltage tapped by the slider 36.

In the schematic diagram shown in Fig. 7 the circuit disclosed is utilized to test the thermocouple lead resistance to within an accuracy of 0.02 ohm. This is accomplished by employing substantially a Wheatstone bridge network in which one leg of the bridge has substituted therefor, a known resistance plus the thermocouple lead resistance. The battery 31 has its negative side connected by the line 50 (and line 61 in Fig. 2), to the switch 21c and thence to the common negative binding post 25. The positive side of the battery is connected by line 43, slide wire resistor 44 and line 45 to tap 46 on rheostat 47. Rheostat 47 is connected to resistor 48 and line 49 to switch 21a which in turn is connected by a line 78 (see Fig. 2) to a point intermediate two resistors 79 and 80, resistors 79 and 80 preferably each have a value of 22 ohms. The resistor 79 is connected to a switch arm 81 of a switch controlled by the button 24 which protrudes through the cover plate 11 of the instrument face. A contact 82 normally in engagement with switch arm 81 is connected to a resistor 83, which may have a value equal to the lead resistance plus 24 ohms, to the negative binding post 25. The resistor 80 has its end portion connected by a line 90 to a resistor 84 which is in turn connected to the negative binding post 25. From line 90, a line 91 (see Fig. 2) connects the switch 21b through line 52 to the deflecting galvanometer 16. The line 51 leads from the other side of the galvanometer to the junction between legs 39a and 39b of the compensating bridge. Attached to the junction between legs 39b and 39c is line 41 which connects with line 59 to switch 21d which in turn is connected by a line 85 to the switch arm 81. The deflecting galvanometer is calibrated to read a maximum of 2 ohms, and accordingly, in order to provide readings for thermocouple resistant leads in excess of 2 ohms and up to a maximum of 24 ohms, a step resistance, generally indicated by the reference numeral 23 and operable by the control member 22 is provided. Manipulation of the switch button 24 substitutes for the resistance 83, a total resistance which is the sum of the designated resistance in the step resistance plus the thermocouple lead resistance. To this end there is provided a switch arm 87 connected to the step resistance 23. A shunt 88 controlled by the member 22 varies the amount of resistance between the contact arm 87 and the binding post 26. Each step in the resistance 23 preferably has a value of 2 ohms.

The operation of the instrument will be described as it would be employed to test a thermocouple system. In such a system there is a hot junction of the thermocouple located remote from the indicating pyrometer, but connected thereto by the thermocouple leads. The values given for the instant embodiment of the meter described supra is for a thermocouple having a hot junction composed of "Chromel" and "Alumel." Though it is to be understood that by changing the values of the resistances in the instrument, other thermocouples formed of different material may be tested.

The operator initially positions the thermocouple hot junction in a thermocouple heater which maintains the hot junction at a known temperature. Then, the operator adjusts the meters to mechanical zero by means of zero adjustments 29 and 29a. The leads from the thermocouple to the pyrometer are disconnected and lead wires from the instrument are attached thereto. The manually operable member 21 is positioned at the poteniometer setting, i.e., test position #1 which gives the test circuit indicated in Fig. 3. The knob 18 is manipulated to vary the effect of rheostat 35 until 4.8 milliamperes flows through milliammeter 17. This provides the correct current through the compensating circuit 32 to cause the circuit to compensate for the ambient temperature of the cold junction. Additionally, by using the current as a reference, variations in the battery voltage will not affect the accuracy of the instrument. The knob 19 is then actuated to provide a coarse adjustment of the deflecting galvanometer 16. Fine adjustment to set the galvanometer 16 to zero is provided by the knob 20 attached to the tap 58 for moving it along the slide wire resistance 44 to accurately adjust the galvanometer 16 to zero. When the galvanometer 16 is balanced to zero the temperature of the thermocouple in the system is read on the upper dial of the main meter 14 as indicated by the indicator 13. By comparing the reading on the meter 14 and the known temperature at which a thermocouple hot junction is, the error induced in the system by the thermocouple hot junction is quickly ascertained. It will be apparent from the circuit that when the galvanometer 16 is balanced to zero there is no interchange of current between the two circuits 32 and 33 and that the voltage drop across the calibrated resistor 55 is the same as the voltage developed between the thermocouple junctions with ambient temperature compensation. The meter 14 measures the current through the resistor 55 and by having its scale calibrated in degrees of temperature, the temperature of the thermocouple hot junction can be read.

The next step in testing the thermocouple system is to move the manually controlled member 21 to the indicator test position or test position 2 which forms the circuit shown in Fig. 4. A lead wire, not shown, is connected from the common negative binding post 25 and a lead wire from the positive binding post 27 or binding post 28, whichever is applicable depending on the external resistance of the pyrometer to the minus and plus contacts respectively of the pyrometer. When the pyrometer has an external resistance of 8 ohms, then post 27 is used, while if it has an external resistance of 22 ohms, post 28 is used. Since the pyrometer under test is provided with a means to compensate for the ambient temperature, the main meter 14 has to be adjusted to also be compensated for the ambient temperature. This is done by adjusting the indicator 13 of the meter 14 to the ambient temperature by means of the zero adjustment 29. The operator then grasps knobs 18 and 20 and moves them until the deflecting galvanometer 16 indicates zero. Then by alternately balancing one against the other and keeping the galvanometer 16 around zero, the indicator of the pyrometer under test is advanced to the desired temperature at which it is to be tested. The main meter 14 is then read and any difference is an error in the pyrometer. If desired, rather than have the pyrometer read the desired temperature, by the following operation it is possible to have the main meter read the desired temperature. This is accomplished by initially setting the manually controlled member 21 to test position 1 and then adjusting rheostats 47 and the balancing potentiometer 20 to pass sufficient current through the main meter 14 until it indicates the desired temperature. The member 21 is then switched to test position 2 and the lead wires connected to the pyrometer. If there is any deflection of the galvanometer 16 it is balanced to zero by rheostat 35. The difference that the pyrometer reads from the main meter is the error. This latter method is preferred since where the error lies greater or less is more apparent and all the operator has to do is adjust the pyrometer until it reads the same as the main meter 14. It will be apparent in this circuit that with the galvanometer 16 balanced to zero that there is no interchange of current between the two circuits. The battery 30 and its accompanying circuit supplies the voltage and current to the pyrometer under test while the meter 14 reads the current necessary to pass through resistor 55 to create the same voltage as that applied to the pyrometer. Though the milliammeter 17 is in the circuit as is also the compensating bridge 39, these elements merely act as resistances and thus do not perform as a meter or compensating element.

For measuring the thermocouple leakage resistance to ground when the hot junction is hot (Fig. 5), the manual control member 21 set at test position #3 and the lead wires are connected together. The tap 58 controlled by knob 20 is adjusted on the slide wire 44 until the meter 14 reads full scale on its lower scale, i.e., zero ohms. This adjusts the circuit for changes in the voltage of battery 31. A lead wire is then connected from the common negative binding post 25 to the ground which may be the aircraft frame and the positive binding post 27 is connected by a lead wire to any conveniently accessible part of the thermocouple system. To test the entire system, the pyrometer should be reconnected to the thermocouple leads. The main meter 14, the battery 31, the thermocouple system and the ground are thus all connected in series. With an infinite resistance, there will be no current flowing but if there is any leakage in the thermocouple system the meter will deflect toward zero.

To test the leakage resistance to ground of the thermocouple system when the thermocouple hot junction is cold the manual control member 21 is positioned at high ohms, i.e., test position #4. The lead wires are connected to the common binding post 25 and to the binding post 27. The leads are then connected together to short them and rheostat 35 is adjusted by means of knob 18 to provide a current flow through the deflecting galvanometer 16 sufficient to give a full scale reading, i.e., zero ohms. The lead wires are then disconnected from each other and the negative lead wire connected to the ground while the positive lead wire is connected to an accessible portion of the thermocouple system. This results in a potential of approximately 67½ volts, which is the voltage of the battery 31a, being impressed between the thermocouple system and the ground, provided there is no current flowing. If there is any leakage from the thermocouple system to the ground, current will flow therethrough with the result that the galvanometer 16 will be deflected from its infinity reading and the resistance of the leakage will be measured. Any value lower than 10,000 ohms is capable of creating an error in the thermocouple system and hence is not permissible.

To measure the resistance of the thermocouple leads wherein the thermocouple hot junction is part of the leads the manual control knob 21 is positioned at the 24 ohm mark, i.e., test position #5 which results in the circuit shown in Fig. 7. The thermocouple leads are connected to the binding posts 25 and 26 with the correct polarity. The rheostat 46 is adjusted until the galvanometer 16 indicates 2 ohms, i.e., full scale deflection, without pushing the button 24. This calibrates the meter with regard to changes in the voltage of battery 31. Since the approximate resistance of the leads is estimatable, the control member 22 of the step resistor 23 is set at this resistance minus 2 ohms. For example, if the resistance is thought to be about 12 ohms the member 22 is set at 10, and if the actual resistance is between 10 and 12 ohms, the indicator 15 on the galvanometer 16 will read between its range of zero to 2 ohms when the switch button 24 is depressed. This indicated ohm resistance plus the resistance at which the control member 22 is positioned is the resistance of the leads within 0.02 ohms. It will be apparent that even without estimating the resistance of the leads, merely starting at the 22 ohm position and decreasing the amount of step resistance, the indicator will at one point of the control member be within its range. If the resistance of the leads is greater than 24 ohms the control member 21 is set at the low ohms position, i.e., test position #3, resulting in the circuit shown in Fig. 5, thus making the main meter 14 function as an ohmmeter. It will be observed that depressing the button 24 to actuate the switch lever 87 substitutes for the resistor 83, a resistance composed of the step resistor 23 plus the resistance of lead wires.

From the foregoing it will be understood that there has been disclosed a single meter which can accurately test the elements of a thermocouple system and trace the cause of any inaccuracies therein. The meter is characterized by its simplicity of construction, small size permitting ready portability and the manner in which the various elements are combined and interrelated to form highly accurate testing circuits. Additionally, it will be noted that though various elements are in the different circuits they do not contribute an essential function in the circuit, but merely serve as resistors. For example, the milliammeter 17 in Fig. 3 serves as a necessary element but in Figs. 4 and 6, it is merely a resistance. Likewise, the compensating bridge in Figs. 4, 6 and 7 is merely a resistance and does not perform its normal function of compensating for ambient temperature. This is one of the features of the present invention which permits the disclosed embodiment to be of simple construction and yet accurate.

Variations and modifications may be made within the scope of the claim and portions of the improvements may be used without others.

I claim:

A testing instrument for a thermocouple system having a hot junction, leads and a pyrometer for testing the components of the system for error comprising a container having a panel formed with openings therein; an indicating meter, a deflecting galvanometer balanceable to zero and a current measuring instrument positioned within the container and having their indicating faces located adjacent the openings to be visible therethrough; a potentiometer positioned within the container and having an operating knob protruding from the panel; a first and second rheostat positioned within the container with each having an operating knob protruding from the panel; a first, second and third source of E.M.F.; and a multi-gang selecting switch having at least five operating positions with an operating knob protruding from the panel for enabling operation of the switch to interconnect the above elements for testing the thermocouple system; one of said positions forming a hot junction temperature measuring means, connectible to the hot junction of the system having a compensating circuit including the first source of E.M.F., the current measuring instrument and the second rheostat for adjusting the flow of current in the circuit and a balancing circuit including the potentiometer, the first rheostat, the second source of E.M.F. and the indicating meter positioned to read the current flowing in the balancing circuit and the deflecting galvanometer being electrically positioned between the two circuits for indicating when there is no current flow between the circuits whereby the temperature of the hot junction is indicated on the indicating meter; a second of said positions forming a pyrometer accuracy determining means, connectible to the pyrometer, having a circuit applying voltage to the pyrometer including the first source of E.M.F. and the first rheostat, and a measuring circuit including the second source of E.M.F., the potentiometer, the second rheostat, and the indicating meter for indicating the current flow in the measuring circuit and the deflecting galvanometer electrically positioned between the circuits for indicating when there is no current flow between the circuits whereby the voltages across the pyrometer and the indicating meter are thereby equal and the readings of each should be identical; a third of said positions forming a hot leakage measuring means, connectible to the leads, for measuring the leakage to ground when the hot junction is hot, having a circuit including the second source of E.M.F., the potentiometer and the indicating meter connected in series with the system and ground whereby any leakage in the thermocouple system changes the reading of the indicating meter; a fourth of said positions forming a cold leakage measuring means, connectible to the leads, for measuring the leakage to ground when the hot junction of the thermocouple is cold, having a circuit including the third source of E.M.F., the first rheostat and the deflecting galvanometer connected in series to the system and ground whereby leakage to ground in the system changes the reading of the galvanometer; and a fifth of said positions forming a resistance measuring means connectible to the leads for measuring the resistance of the leads including a circuit having the indicating meter, the second source of E.M.F., the second rheostat and a resistor connected in series, a step resitsance having an operating knob protruding from the panel with each step equal to the value of the full scale reading of the indicating meter and a switch means for opening the circuit through the resistor and connecting the step resistance and leads in series in the circuit therefor.

References Cited in the file of this patent
UNITED STATES PATENTS 2,764,892     Rosenthal _____ Oct. 2, 1956

FOREIGN PATENTS 995,562     France _____ Dec. 4, 1951